United States Patent [19]

Moreau et al.

[11] Patent Number: 5,843,499

[45] Date of Patent: Dec. 1, 1998

[54] CORN FIBER OIL ITS PREPARATION AND USE

[75] Inventors: Robert A. Moreau, Quakertown; Kevin B. Hicks, Malvern, both of Pa.; Robert J. Nicolosi, Tyngsborough, Mass.; Robert A. Norton, Peoria, Ill.

[73] Assignee: The United States of America as represented by the Secretary of Agriculture, Washington, D.C.

[21] Appl. No.: 947,018

[22] Filed: Oct. 8, 1997

Related U.S. Application Data

[63] Continuation of Ser. No. 569,473, Dec. 8, 1995, abandoned.

[51] Int. Cl.$^6$ ..................................................... A23D 7/005
[52] U.S. Cl. ............................... 426/2; 426/611; 426/482; 426/489; 426/492; 426/417; 554/8; 554/9; 554/11; 554/12; 424/439
[58] Field of Search ..................................... 426/478, 481, 426/482, 484, 611, 489, 492, 417, 2; 554/8, 9, 11, 12; 424/439

[56] References Cited

U.S. PATENT DOCUMENTS

| | | | |
|---|---|---|---|
| 3,928,631 | 12/1975 | Freeman | 426/18 |
| 4,181,747 | 1/1980 | Kickle | 426/615 |
| 4,181,748 | 1/1980 | Chwalek | 426/623 |
| 4,738,772 | 4/1988 | Gresfeldt | 209/1 |
| 4,757,948 | 7/1988 | Nonaka | 241/7 |
| 5,073,201 | 12/1991 | Gresfeldt | 127/67 |

OTHER PUBLICATIONS

Watson 1994 Corn Chemistry and Technology Amer. Assoc Cereal Chemists St Paul Minnesota pp. 311–312, 337–339, 377–384.

Hoseney 1986 Principles of Cereal Science & Technology 2nd ed. Amer. Assoc Cereal Chemists St Paul Minnesota pp. 147–156.

Norton, R., "Quantiation of Steryl Ferulate and p–Coumarate Esters from Corn and Rice", *Lipids*, vol. 30 (3), pp. 269–274.

Rogers et al., "Identification and Quantitation of y–Orzanol Components and Simultaneous Assessment of Tocols in Rice Bran Oil", *Jaocs*, vol. 70 (3), pp. 301–307 (1993).

Norton, R., "Isolation and Identification of Steryl Cinnamic Acid Derivatives from Corn Bran", *Cereal Chem.*, vol. 71(2) (1994).

Seitz, L., "Stanol and Sterol Esters of Ferulic and p–Coumaric Acids in Wheat, Corn, Rye, and Triticale", *J. Agric. Food Chem.* vol. 37, pp. 662–667 (1989).

*Primary Examiner*—Carolyn Paden
*Attorney, Agent, or Firm*—M. Howard Silverstein; John D. Fado; Janelle S. Graeter

[57] ABSTRACT

An oil extractable from corn fiber contains ferulate esters, in particular sitostanyl ester, which has been shown to have cholesterol-lowering activity. The oil is extracted by a novel process which includes a grinding step carried out before extraction with an effective organic solvent such as hexane. The corn fiber oil may be combined with an ingestible and/or edible carrier for administration as a dietary supplement for cholesterol-lowering purposes.

16 Claims, 4 Drawing Sheets

CORN FIBER OIL ITS PREPARATION AND USE

This application is a continuation, of application Ser. No. 08/569,473, filed Dec. 8, 1995 now abandoned.

BACKGROUND OF THE INVENTION

1. Field of the Invention

Clinical studies have demonstrated the health benefits of cholesterol-lowering drugs. Naturally-occurring oil derived from rice has been found to contain substances which have cholesterol-lowering properties. Ferulate esters, normally found in rice bran and rice bran oil, are among the substances implicated. This invention relates to a unique oil obtained from corn hull fiber by a novel process. The process includes a pre-grinding step followed by extraction with hexane or supercritical carbon dioxide and results in a unique composition containing ferulate esters having sitostanol as a major sterol component and other components, i.e. other sterol esters.

2. Description of the Prior Art

Ferulate esters are part of a group of compounds which are comprised of phytosterols which are esterified to cinnamic acid derivatives (i.e. ferulic acid) and are known to occur in corn, wheat, rye and other cereal grains. Oryzanol, the common name for the ferulate esters obtained from rice bran has been shown to lower the levels of serum cholesterol in laboratory animals and man (Kahlon et al. 1992. *Cereal Chem.* vol. 69, pp. 485–489 and Nicolosi et al., 1991. *Atherosclerosis.* vol. 88, pp. 133–138). The major sterol components of ferulate esters in oryzanol extracted from rice bran are campesterol, cycloartenol.and 24-methylene cycloartanol.

Seitz (*J. Agric. Food Chem.* 1989. vol. 37, pp. 662–667) confirmed the presence of sitostanyl ferulates in corn and wheat and reported the presence of lower levels of campesteryl, campestanyl and sitosteryl ferulates. Samples of both ground whole kernels and dissected kernels (where the outer pericarp was peeled off, the kernel split open and the endosperm scraped away from the inner pericarp with a scalpel) were tested, and it was determined that the stanyl and steryl ferulates were contained in the inner pericarp.

Norton (*Cereal Chem.* 1994. vol. 71, no. 2, pp. 111–117) carried out studies on corn bran in order to isolate and identify the esters of sterols and cinnamic acid derivatives and reported 10 compounds which appeared to be steryl cinnamic acid derivatives, including steryl ferulates such as sitostanyl ferulate.

There have been no reports of an extractable oil present in corn fiber, in particular an oil comprising substances having cholesterol-lowering properties, i.e. ferulate esters.

SUMMARY OF THE INVENTION

We have discovered that the unique oil can be extracted from corn hull fiber with hexane or supercritical carbon dioxide. The composition of this new type of oil, corn fiber oil, is different from that of commercial corn oil which is obtained by the hexane extraction of corn germ. Whereas commercial corn oil is comprised of about 99% fat (triacylglycerol), corn fiber oil contains only about 73% fat, 8% sterol (fatty acyl) esters, 4% free sterols, 6% diacylglycerols and 6% ferulate (sterol) esters.

In accordance with this discovery, it is an object of the invention to provide a novel oil, i.e. corn fiber oil, which contains ferulate esters.

It is another object of the invention to provide a novel method of producing corn fiber oil.

It is also an object of the invention to provide a composition comprising corn fiber oil which is effective as a cholesterol-lowering agent.

Other objects and advantages of the invention will become readily apparent from the following description.

BRIEF DESCRIPTION OF THE DRAWINGS

FIG. 2A represents detection with Evaporative Light Scattering Detector (ELSD)

FIG. 3A represents the standard curve for sterol esters, FIG. 3B for triacylglycerols, FIG. 3C for free fatty acids, FIG. 3D for phytosterols, FIG. 3E for ferulate esters and FIGS. 3F and G for tocopherols. FIGS. 3A–F represent detection by ELSD while

DETAILED DESCRIPTION OF THE INVENTION

Figure 1:
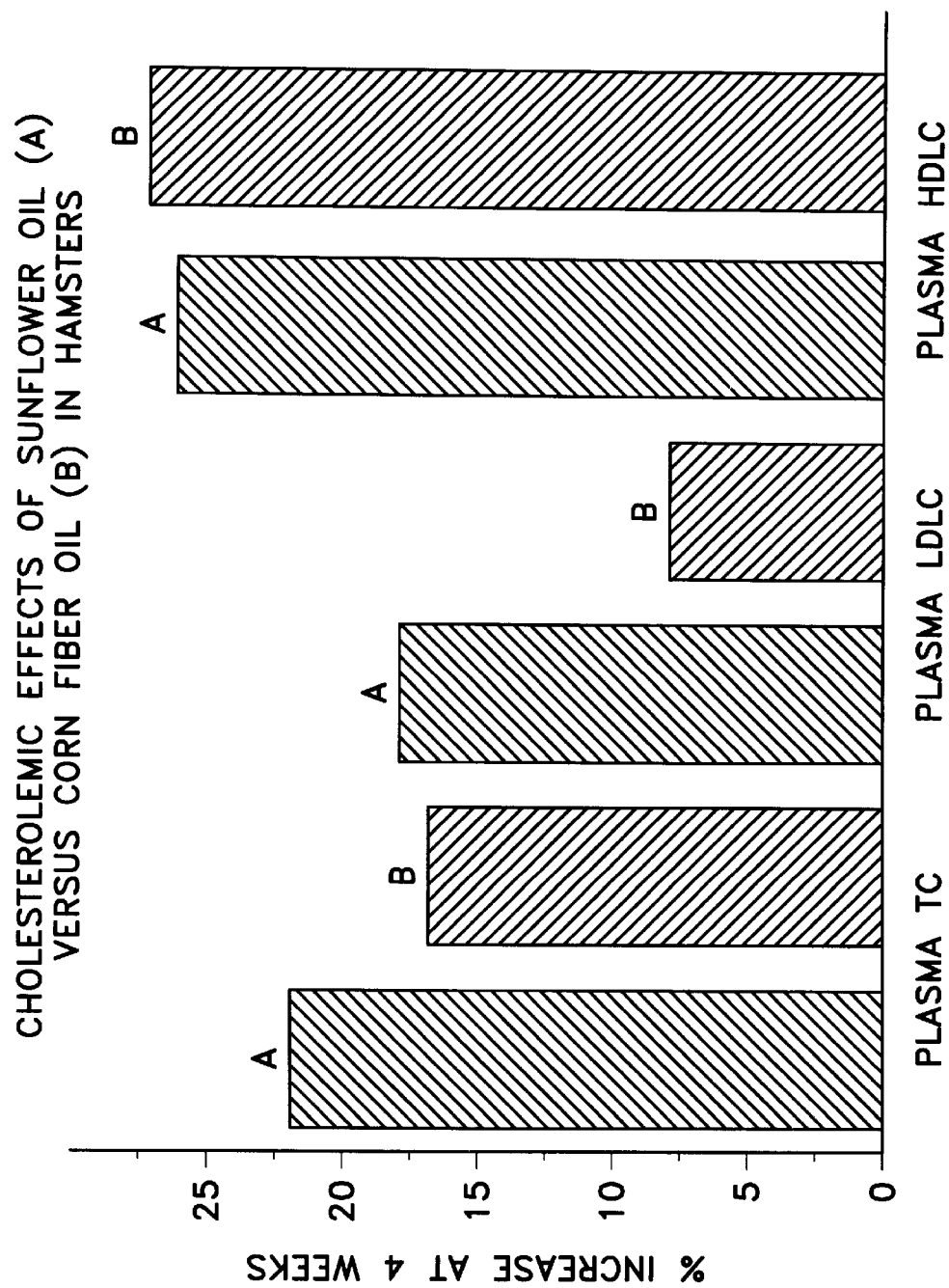
FIG. 1 shows the effects of sunflower oil (A) vs. corn fiber oil (B) on plasma total cholesterol (TC), low density lipoprotein cholesterol (LCLC) and high density lipoprotein cholesterol (HDLC) levels in hamsters.

Corn fiber is an abundant low-value by-product obtained during the "wet-milling" of corn in the process of producing starch, corn sweeteners and ethanol. It is defined herein as the product obtained from the wet-milling process, which involves an initial steeping of corn kernels in aqueous $SO_2$ at an elevated temperature followed by gentle grinding and physical separation of the outer fiber layers from starch, protein and other components. Wet-milling of corn is used by all companies that produce cornstarch and corn sweeteners, and by many companies that produce fuel ethanol from corn. In contrast, "dry milling" of corn involves grinding of the corn kernels and separating a product called "corn bran" without steeping. Heretofore, the corn fiber portion of the kernel was combined with dried steepwater to make corn gluten feed, a low-value product. It was not previously known that a useful oil could be successfully extracted.

Low levels of corn fiber oil can be obtained by extracting corn fiber with hexane or supercritical carbon dioxide; however, we have developed a unique pregrinding process to obtain much more oil (3- to 10-fold higher levels) from corn fiber. Although the composition and nutritional value of commercial corn oil has long been known, the presence of another type of oil which could be extracted from corn fiber was unexpected. In addition, the composition and properties are clearly different from those of commercial corn oil, as pointed out above.

Corn fiber oil may be prepared according to the following steps:

a) separating corn fiber from corn kernels, b) drying the corn fiber, c) grinding the corn fiber, d) extracting oil from the ground corn fiber with an organic solvent, e) separating the extracted corn fiber oil from the organic solvent.

Corn fiber is separated from the corn kernel by steeping corn kernels in aqueous $SO_2$ (about 0.12 to about 0.20%, v/v) at about 50° C. to about 55° C. for about 24 to about 48 hours, followed by a gentle grinding and physical separation of the outer fiber layers from the remainder of the kernel. The outer fiber layers contain the outer and inner pericarp and aleurone layers.

The corn fiber is dried at a temperature of about 25° C. to about 65° C., followed by grinding of the samples. The time and temperature of the drying step is not critical so long as the corn fiber is sufficiently dry to be easily worked with. Drying at room temperature for a time sufficient to achieve dryness of the corn fibers is effective. The physical structure of dry corn fiber is comprised mainly of large pieces (>5 mm) or "shreds". When unground fiber is extracted with hexane, very little oil (0.31 wt %) can be obtained (Table 1). Grinding of the fiber results in a significant increase in the level of extractable oil, however, and the finer the grind, the more oil that can be extracted. Particle sizes of about 20 mesh to about 80 mesh have been found effective. A 20 mesh grind has been found sufficient for most purposes, however, depending upon the need or expectation for yield and the willingness to meet the additional energy requirements, finer grinds are equally useful and will result in higher yields of oil.

The extraction step may be carried out utilizing any effective organic solvent, hexane being preferred. Ground corn fiber and solvent are mixed, shaken for about one hour at a temperature of about 25° C. Alternatively, extraction may be carried out by supercritical fluid extraction, a technique which is conventional and well-known in the art. Effective extraction conditions with supercritical $CO_2$ are about 25 min at about 2.5 L/min, about 10,000 psi and about 40° C.

The corn fiber oil is separated from the extraction medium by conventional separation means which is effective, such as filtration of the extract and evaporation of the solvent.

Studies were carried out to determine the optimal extraction conditions (see Examples I and II). Grinding the fiber to a particle size of 20 mesh before hexane extraction increased the levels of extractable oil by sixfold, as compared to the unground material. Results showed that the finer the fiber was ground (30, 40, 60 and 80 mesh), the more oil that could be extracted. The finest grind of 80 mesh resulted in an extractable oil content of 3.33 wt %. Attempts to "shatter" the 60 mesh ground fiber into even smaller pieces in a mortar and pestle with liquid nitrogen did not further increase the levels of extractable lipids, however. Extending the time of extraction from 1 hour to 18 hour or increasing the temperature of extraction from 25° to 65° C. did not significantly increase the levels of extractable oil (Table 1). Supercritical fluid extraction of unground corn fiber yielded about 50% more extractable oil than hexane extraction of unground fiber. However, supercritical fluid extraction of 20 and 80 mesh ground corn fiber yielded slightly less oil than hexane extraction.

In addition to measuring the levels of extractable oil in unground vs. ground fibers, the levels of ferulate esters were also quantitatively analyzed (Table 1). Grinding increased the levels of hexane-extractable ferulate esters by 33% and 89% in fiber ground to 20 and 80 mesh, respectively. Although the concentrations of ferulate esters (wt % ferulate esters) in the oils obtained from fibers ground to various particle sizes was highest in unground fiber, the yield of oil from unground fiber was very low. Soxhlet extraction of the 20 mesh fiber increased the amount of oil extracted by 21% and decreased the concentration of ferulate esters in the oil by 25% (compared to) the 1 hour, 25° C. extraction.) Grinding also increased the levels of supercritical fluid-extractable ferulate esters by 33% and 300% in fiber ground to 20 and 80 mesh, respectively.

TABLE 1

The Effect of Particle Size and Temperature on the Extraction of Oil and the Levels of Ferulate Esters in Corn Fiber Oil. Data Presented Is the Mean of Two Extractions, with Two Injections Each ± Standard Deviation.

| Particle Size | Extraction Solvent | Extraction Time & Temp (°C.) | Extractable Oil from Fiber wt % | Ferulate Esters in Fiber wt % | Ferulate Esters in Oil wt % |
|---|---|---|---|---|---|
| unground | hexane | 1 h, 25° | 0.31 | 0.09 ± 0.00 | 29.06 ± 0.74 |
| 1.5 mm | hexane | 1 h, 25° | 1.10 | 0.10 ± 0.00 | 9.26 ± 0.11 |
| 20 mesh | hexane | 1 h, 25° | 1.69 | 0.12 ± 0.10 | 6.77 ± 0.72 |
| 30 mesh | hexane | 1 h, 25° | 2.23 | 0.14 ± 0.01 | 6.28 ± 0.74 |
| 40 mesh | hexane | 1 h, 25° | 2.45 | 0.15 ± 0.02 | 6.01 ± 0.81 |
| 60 mesh | hexane | 1 h, 25° | 3.24 | 0.18 ± 0.02 | 4.95 ± 0.45 |
| 80 mesh | hexane | 1 h, 25° | 3.33 | 0.17 ± 0.02 | 4.95 ± 0.45 |
| 60 mesh | hexane | 1 h, 25° & ln[a] | 2.96 | 0.14 ± 0.00 | 4.68 ± 0.04 |
| 20 mesh | hexane | 18 h, 25° | 1.78 | 0.11 ± 0.01 | 6.06 ± 0.90 |
| 20 mesh | hexane | 1 h, 65° | 1.67 | 0.11 ± 0.01 | 6.42 ± 1.30 |
| 20 mesh | hexane | 18 h Soxhlet | 2.05 | 0.11 ± 0.01 | 5.17 ± 0.25 |
| unground | SC—$CO_2$ | 25 m, 40° | 0.48 | 0.06 ± 0.00 | 12.28 ± 0.83 |
| 20 mesh | SC—$CO_2$ | 25 m, 40° | 1.47 | 0.08 ± 0.00 | 5.38 ± 0.06 |
| 80 mesh | SC—$CO_2$ | 25 m, 40° | 2.91 | 0.18 ± 0.00 | 4.37 ± 0.02 |

[a]ln = Ground fiber (60 mesh) was further pulverized by grinding for 5 min in a mortar and pestle with liquid nitrogen before hexane extraction.
SC—$CO_2$ = Supercritical $CO_2$.

A comparison of the levels of oil and ferulate esters in various fiber samples was also carried out. Samples of corn fiber and fiber related products were obtained from several sources, extracted, and the levels of ferulate esters in the oils were analyzed (Table 2). For example, fiber samples derived from the milling of four different corn hybrid varieties were obtained. Among the four, the fiber from high amylose corn had the highest levels of extractable oil, and the oil extracted from the fiber of common (yellow dent #2) corn had the highest levels of ferulate esters. Corn gluten feed, which is a blend of corn fiber and corn steep liquor, had 1.29% extractable oil, and its oil contained 3.64% ferulate esters.

Yellow waxy kernels also were ground and extracted and found to contain 2.81% extractable oil, and their oil contained 0.23% ferulate esters. Seitz, supra, reported that most of the ferulate esters in corn kernels are in the pericarp, which is the major part of the fiber fraction. Assuming that a corn kernel is composed of 5% pericarp (Watson, S. A. "Structure and Composition" In *Corn: Chemistry and Technology;* Watson, S. A. and Ramstad, P. E. 1987. American Association of Cereal Chemists, St. Paul, Minn.) and that the fiber is composed primarily of pericarp and that all of the ferulate esters are in the fiber, it can be estimated (using the measurement of 5.05 wt % of ferulate esters in the fiber of yellow waxy kernels) that yellow waxy kernels should contain (0.05)(5.05 wt %)=0.25 wt % ferulate esters, which is close to the value of 0.23% actually measured in the yellow waxy kernels (Table 2).

TABLE 2

The Lipid Compositon of Corn Fiber Oils Obtained from Various Sources.

| Sample[b] | extractable oil wt % | ferulate esters in oil wt % |
|---|---|---|
| Common[a] Fiber | 1.72 | 6.75 |
| Yellow Waxy Fiber | 2.12 | 5.05 |
| White Waxy Fiber | 2.82 | 4.54 |
| High Amylose Fiber | 3.68 | 2.00 |
| Gluten Feed | 1.29 | 3.64 |
| Yellow Waxy Kernels | 2.81 | 0.23 |
| Common[a] Fiber | 2.26 | 2.70 |
| Gluten Feed | 2.37 | 1.08 |
| Hull Fiber | 1.09 | 5.65 |
| Fine Fiber | 0.54 | 3.37 |
| Corn Cleanings | 1.24 | 1.62 |
| Spent Flake | 1.75 | 0.25 |
| Purified Fiber | 1.59 | 1.83 |
| Corn Bran | 1.32 | 1.50 |
| Distillers Grains & Sols | 2.53 | 0.79 |
| Corn Cobs | 0.20 | 0 |
| Wheat Bran | 3.36 | 0.80 |
| Oat Bran | 6.75 | 0.40 |

[a]Common = yellow dent #2 corn.
[b]All sample were ground to 20 mesh and 4 grams of sample were extracted with 40 ml hexane for 1 hour at 25° C.

Samples of common fiber and corn gluten feed were obtained from various sources, and oil content as well as the ferulate ester content of the various samples were found to vary. In addition, three fiber samples were obtained from different parts, of the wet milling process (CPC International, Summit-Argo, Ill.). Among these, the hull fiber is produced in the largest volume during processing, and the oil obtained from it contained the highest levels of ferulate esters. Fine fiber and corn cleanings contained relatively low levels of oil and their oil contained relatively low levels of ferulate esters. Spent flake is the "cake" left over when corn germ is hexane extracted; it contained 1.75% extractable oil, and this oil contained only 0.25% ferulate esters. The purified fiber, a finely ground food-grade fiber, contained 1.5% extractable oil and this oil contained 1.83% ferulate esters.

Corn bran obtained from a dry-milling process contained relatively low levels of extractable oil, and its oil container low levels of ferulate esters. Distillers grains and solubles is the "mash" remaining after the fermentation of dry-milled corn, and it contained 2.53% extractable oil which contained 0.79% ferulate esters.

Three additional samples which were not corn fiber but were related materials were included, primarily to assess the accuracy of the HPLC method used for measuring the levels of ferulate esters in these materials. Among these three samples, low levels of ferulate esters were detected in wheat bran and oat bran, and none detected in ground corn cobs.

Although this study revealed that commercial corn fibers contain relatively low levels of oil (0.54 to 3.5 wt %) as compared to rice bran (about 18 wt %, Kahlon et al., supra), the oil obtained from corn fiber is richer in ferulate esters (up to 6.75 wt %) than rice bran oil (0.1 to 0.8 wt % as reported by Rogers et al. 1993. *J. Am. Oil Chem. Soc.* vol. 70, pp. 301–307).

Cardiovascular disease (CVD) is a major cause of mortality for Americans and many industrialized populations, and hypercholesterolemia remains a major risk factor for CVD with approximately 30% of the American population having blood cholesterol levels equal to or greater than 240 mg/dl, thus placing them in the high risk category for CVD. The typical approved American Heart Association diet which focuses on changes in dietary fatty acids and cholesterol is not sufficiently efficacious in many instances to prevent many individuals from requiring drug intervention. Moreover, for many, diet interventions not only reduce the "bad" low-density lipoprotein cholesterol (LDLC), but also the "good" high-density lipoprotein cholesterol (HDLC).

The beneficial effects of cholesterol-lowering drugs have been established, and a naturally-occurring substance having this property would be advantageous over current synthetic drugs in use. Two types of oils, naturally-occurring rice bran oil (Nicolosi et al., supra) and synthetic sitostanol ester margarine, have been noted for their cholesterol-lowering properties. Since the phytosterol component of corn fiber ferulate esters is mainly sitostanol (Norton, supra), a saturated phytosterol that has hypocholesterolemic properties when administered in its free sterol form (Vanhanen et al. 1993. *J. Lipid Res.* vol. 34, pp. 1535–1544), their cholesterol-lowering properties are expected to be at least equivalent to these two products. Ferulate esters have also been suggested as having antioxidant properties.

In order to test the cholesterol-lowering capability of corn fiber oil containing ferulate esters, hamsters were fed a diet of sunflower oil plus dietary cholesterol, and plasma TC, HDLC and LDLC were measured. The animals were then divided into a control group, which remained on a sunflower oil and cholesterol diet, and a test group, which was switched to a corn fiber oil and cholesterol diet, and again plasma TC, HDLC and LDLC were measured (see Example III). Animals in the control group experienced increases in plasma TC (+22%), LDLC (+18%) and HDLC (+26%) while the test animals showed significantly less increases in plasma TC (+17%) and LDLC (+8%) and maintained the same rate of increase in the beneficial HDLC (+27%). Thus, a much more beneficial TC/HDL ratio, 1.9±0.1, was obtained for the test corn fiber oil group over the control group at 2.6±0.1 (FIG. 1).

In order to achieve the beneficial effect of the cholesterol-lowering property of corn fiber oil, a composition comprising the oil and an appropriate carrier which is ingestible and/or edible may conveniently be utilized as a dietary supplement. For example, extracted corn fiber oil may be added in effective amounts to margarine formulations, included in a "health" bar or encapsulated in an edible gel. Effective amounts of the oil are added in amounts up to 10 wt % where the oil contains about 6% ferulate esters.

The following examples are intended only to further illustrate the invention and are not intended to limit the scope of the invention as defined by the claims.

EXAMPLES

Studies were carried out to determine the optimal extraction conditions and to analyze the lipid profile of corn fiber oil using HPLC with ELSD.

Example I
Sample Preparation and Oil Extraction

Samples of corn fiber and other materials were obtained, and all samples except the corn gluten feed were dried at 65C. in a convection tray dryer. Samples were ground to various particle sizes with a Wiley Mill using appropriate screens (Thomas Scientific, Philadelphia, Pa.). Fiber samples (4 g) were placed in screw-top vials (55 m, 25×150 mm), and 40 ml hexane containing 0.1% butylated hydroxytoluene (BHT) was added. The tubes were sealed with Teflon-lined caps and shaken for 1 or 18 hrs in a Burrell Model 75 Wrist Action Shaker (Burrell, Inc., Pittsburgh, Pa.) at 25° C. Tubes were shaken horizontally for 1 hr in a water bath shaker (New Brusnwick Scientific, Edison, N.J.) for the 65° C. extractions. After extraction, the hexane extracts were filtered through a Whatman FF/A glass fiber filter (Whatman Laboratory Products Clifton, N.J.) fitted in a Buchner funnel with gentle vacuum. Separate samples (8 g) of unground and ground corn fiber were extracted with supercritical $CO_2$ (25 min at 2.5 L/min, 10,000 psi and 40° C.) in an Applied Separations (Allentown, Pa.) Speed Supercritical Fluid Extractor. The supercritical fluid-extracted oil was dissolved in hexane and injected into the HPLC. Butylated hydroxytoluene (0.01% v/v) was added to all samples to prevent oxidation.

Example II
High Performance Liquid Chromatography Analysis

The lipid classes in crude filtered hexane extracts were separated and quantified by a modified version of an HPLC technique (Moreau et al., 1990. *Phytochemistry*. vol. 29, pp. 2461–2466). The ternary gradient HPLC system used was a Hewlett: Packard Model 1050 modular system (Hewlett Packard, Avondale, Pa.). Two detectors were connected in series. The first was a Hewlett Packard Model 1050 fixed wavelength UV-visible detector set at 295 nm. The second was an Alltech-Varex Mark III Evaporative Light Scattering Detector (Alltech Associates, Deerfield, Ill.) operated at a temperature of 40° C., with nitrogen as a nebulizing gas at a flow rate of 1.60 standard liters per minute. The column was a Chromsep Cartridge, LiChrosorb DIOL, 5 $\mu$m, 3×100 mm (Chrompack, Raritan, N.J.). The mobile phase gradient of hexane-isopropanol-acetic acid is described in Table 3, and the flow rate was constant at 0.5 ml/min.

Each fiber sample was extracted at least twice, and each of these extracts was analyzed by HPLC at least twice. Results presented are the means and standard deviations combined from multiple analysis.

Figure 2A:
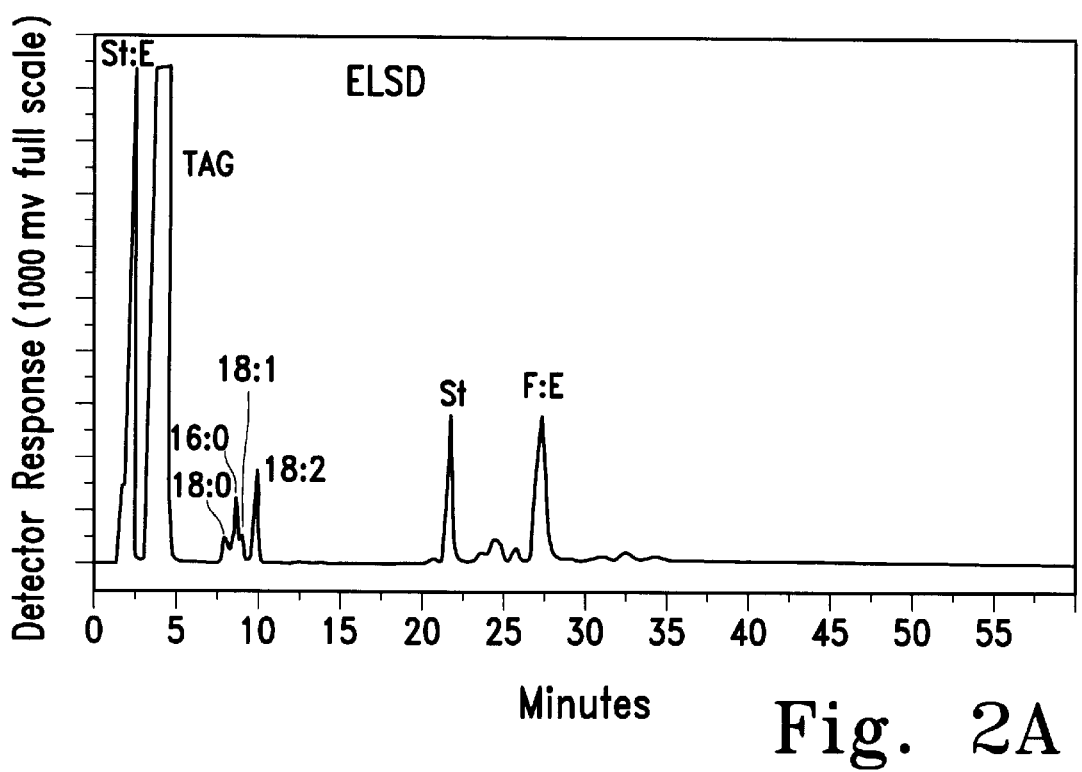
FIGS. 2A and B show a High Pressure Liquid Chromatography (HPLC) chromatogram of the lipids in corn fiber oil.
Figure 2B:
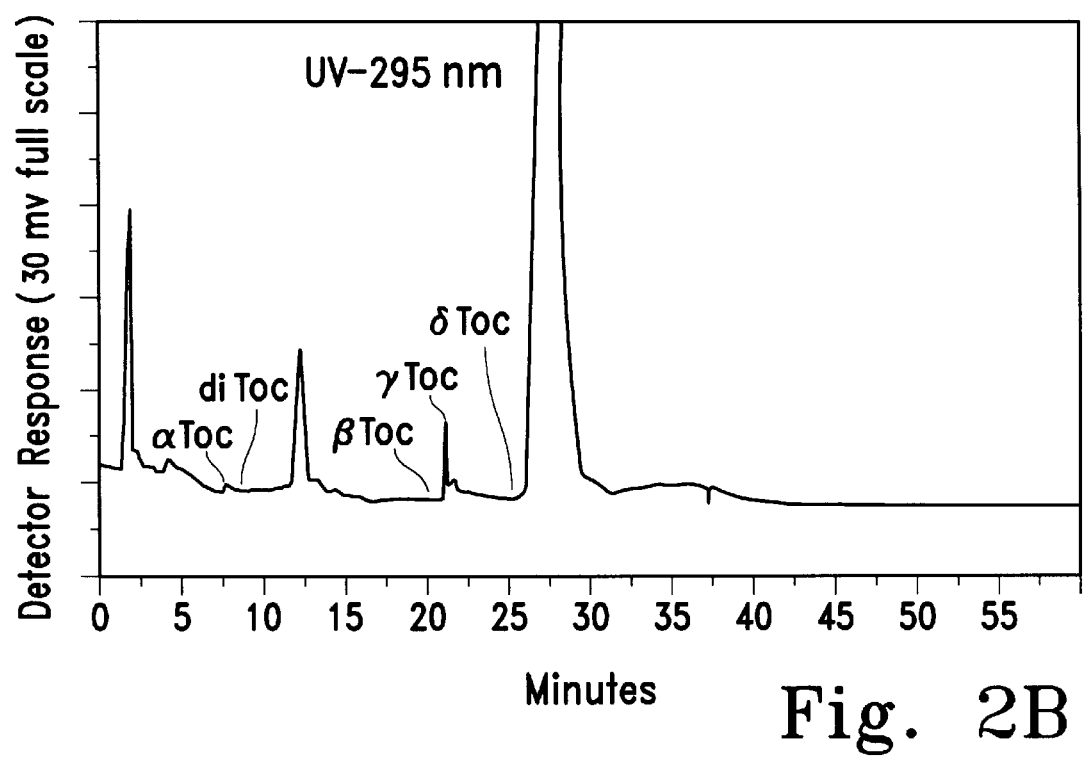
FIG. 2B represents Ultra Violet (UV) detection at 295 nm.
Figure 3C:
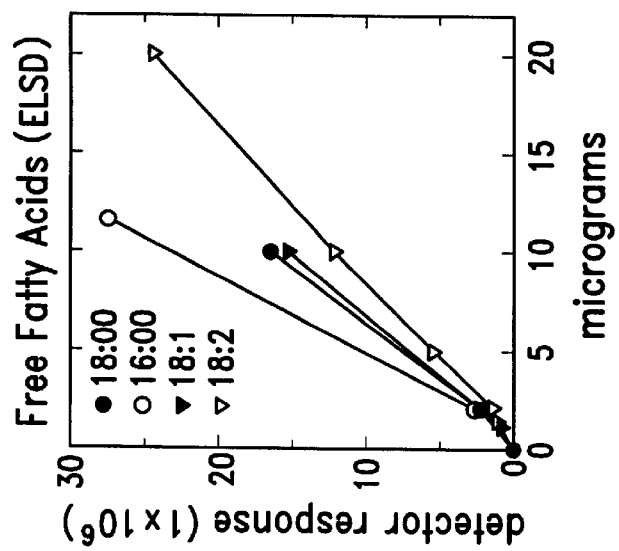
FIGS. 3A–E show standard curves for the calculation of selected lipids detected in corn fiber oil.
Figure 3B:
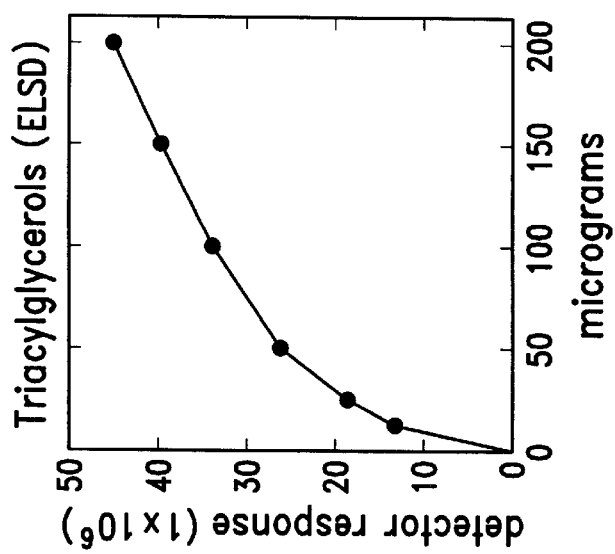
Figure 3A:
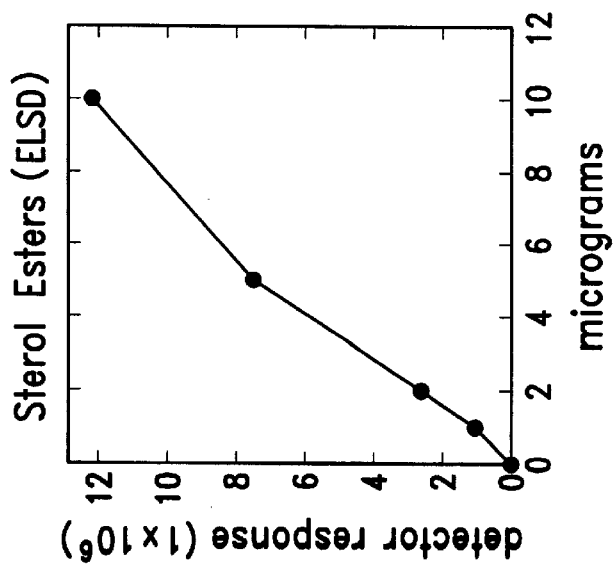
Figure 3D:
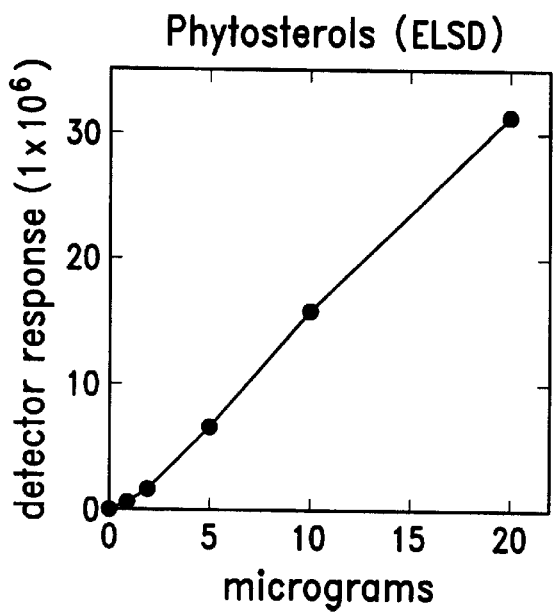
Figure 3E:
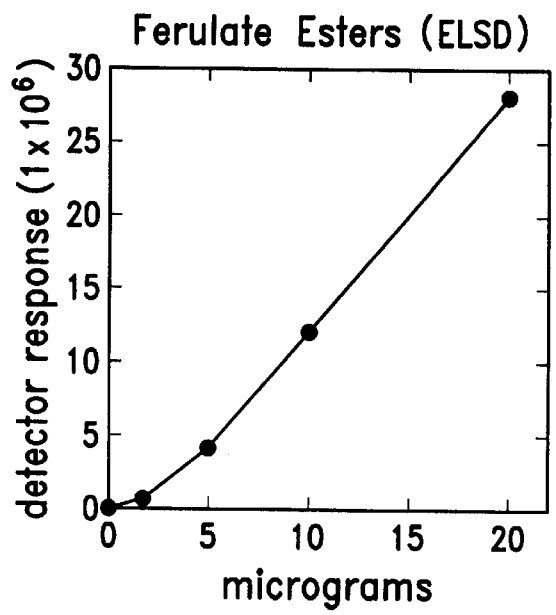
Figure 3F:
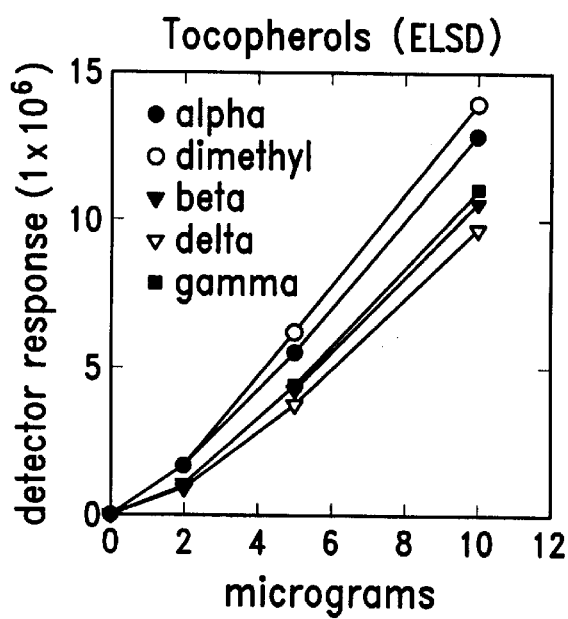
Figure 3G:
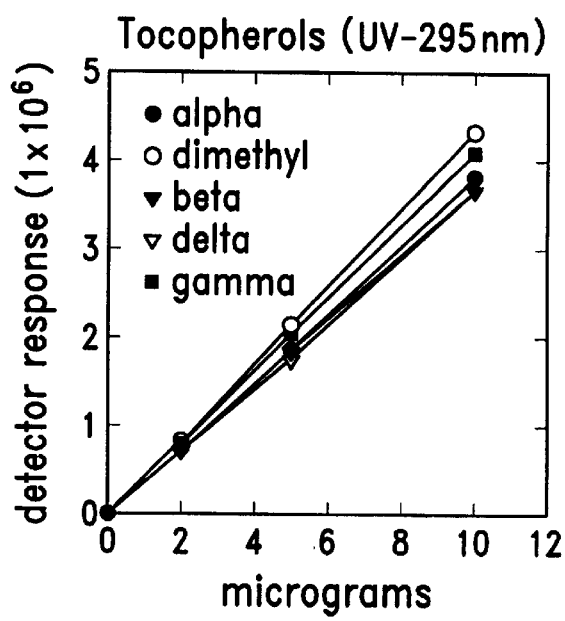
FIG. 3G represents detection by $UV_{295nm}$.

A binary HPLC system was developed to separate (FIG. 2) and quantify (using the standard curves in FIG. 3) the various lipid components in the hexane extracts of corn fiber. A sample (100 $\mu$l) of the crude filtered hexane extract was injected directly into the HPLC without further preparation. By using two detectors in series it was possible to identify the peaks on the ELSD that were also $UV_{295\ nm}$- absorbing peaks. The wavelength of 295 nm was chosen because both tocopherols and ferulate esters

TABLE 3

Linear Gradient Program Used for the Normal-Phase Separation of Lipid Classes in Corn Fiber Oil.

| Time (min) | % A | % B |
|---|---|---|
| 0 | 100 | 0 |
| 8 | 100 | 0 |
| 10 | 99.1 | 0.9 |
| 30 | 99.1 | 0.9 |
| 31 | 100 | 0 |

Note. Column was LiChrosorb DIOL, 5 $\mu$m, (3 × 100 mm) and the flow rate was 0.5 ml/min. A, hexane/acetic acid, 100/l, v/v; and B, isopropanol (Both were added fresh daily to eliminate errors caused by evaporation or adsorption of moisture).

could be detected (Diak, M. and Saska, M. 1994. *J. Am. Oil Chem. Soc.* vol. 71, pp. 1211–1217). The first step of the binary HPLC system (which consisted of 8 minutes isocratic at 99.9/0.1, hexane/acetic acid, v/v) separated sterol esters, triacylglycerols and four free fatty acids (stearic, palmitic, oleic and linoleic). The second step of the gradient (which was essentially a step to isocratic 99.1 A/0.9 B=99.0/0.9/0.1, hexane/isopropanol/acetic acid, v/v, held from 10 to 30 min after injection) separated phytosterols, ferulate esters and several minor unknown peaks. An unknown lipid with a large $UV_{295\ nm}$ absorbance was detected at 12.2 min, but the mass of this compound (as measured by the ELSD) was very low. The oil also contained sterol esters, free fatty acids, phytosterols, and very low levels of tocopherols.

Curves of standards of the major lipid components were constructed (FIG. 3) The relationship between sample mass and ELSD response was not always linear, but was reproducible and the data could easily be entered into the HPLC-data acquisition software to enable it to calculate the mass (in units of $\mu$g) of each lipid component. The range of masses for each of the standards was calculated to approximate the ranges encountered in the analyses of the corn fiber oil samples. Because triacylglycerols were present in much higher concentrations than any of the other lipid classes, the upper mass range of triacylglycerols was 200 $\mu$g, while the upper mass range of all other lipid classes was 10 to 20 $\mu$g. The standard curves reported here were similar in shape to those recently reported by Christie, W. and Urwin, R. (1995. *J. High Resol. Chromatogr.* vol. 18, pp. 97–100), using the same model of ELSD. Standard curves for the tocopherols were constructed using both the ELSD and UV detectors (FIGS. 3F and 3G) For quantification of the levels of the only measurable tocopherol, $\gamma$ tocopherol, the UV standard curve (FIG. 3G) was used, because the retention time of this component was very close to that of the phytosterol and it would have been difficult to distinguish between phytosterol and $\gamma$ tocopherol with the ELSD. However, since phytosterols do not absorb at 295 nm, the UV chromatogram could be used for accurate quantification of $\gamma$ tocopherol.

The standard curves (FIG. 3) were used to provide a quantitative analysis of the lipid classes in corn fiber oil. As shown in Table 4, triacylglycerols were the major component in all types of corn fiber oil. The other major components in a representative sample of corn fiber oil (American Maize, common corn fiber ground to 20 mesh) were ferulate esters (6.7 wt %), phytosterols (1.92 wt %), free fatty acids 2.86 wt %) and sterol esters (9.05 wt % of oil). Among the tocopherols, only two were detected; low levels (0.04 wt %) of $\gamma$ tocopherol and trace levels of $\alpha$-tocopherol.

TABLE 4

Quantitative Analysis of Lipid Classes in Corn Fiber Oil Obtained via Hexane Extraction of Ground (20 mesh) American Maize Common Corn (Yellow Dent #2). Fiber (4 g Fiber Extracted in 40 ml Hexane for 1 H at 25° C.) via HPLC-ELSD. Data Presented Is the Mean of Two Extractions, with Two Injections Each ± Standard Deviation.

| Lipid Class | Abbrev | rt (min) | wt % of Fiber | wt % of Oil |
|---|---|---|---|---|
| Sterol-FA esters | St:E | 2.0 | 0.19 ± 0.01 | 9.05 ± 0.54 |
| Triacylglycerols | TAG | 4.1 | 1.321 ± 0.23 | 79.43 ± 2.01 |
| Free Fatty Acids | 18:0 | 8.05 | 0.011 ± 0.000 | 0.55 ± 0.00 |
|  | 16:0 | 8.78 | 0.019 ± 0.001 | 0.93 ± 0.04 |
|  | 18:1 | 9.16 | 0.011 ± 0.001 | 0.51 ± 0.01 |
|  | 18:2 | 10.01 | 0.018 ± 0.000 | 0.87 ± 0.01 |
| Tocopherols |  |  |  |  |
| α | α Toc | 7.4 | tr | tr |
| dimethyl | di Toc | 8.6 | nd | nd |
| β | β Toc | 19.6 | nd | nd |
| γ | γ Toc | 20.7 | 0.001 ± 0.000 | 0.04 ± 0.1 |
| δ | δ Toc | 26.3 | nd | nd |
| Phytosterols | St | 21.7 | 0.039 ± 0.017 | 1.92 ± 0.83 |
| Ferulate Esters | F:E | 27.5 | 0.11 ± 0.01 | 6.70 ± 0.25 |

Example III

Treatment of Hamsters with Ferulate Esters

Sixteen male Golden Syrian hamsters, at 8 weeks of age, were housed individually in hanging cages and fed diets containing 10% sunflower oil plus 0.4% dietary cholesterol for 10 weeks. After an overnight fast, plasma was collected into heparinized tubes and plasma TC, HDLC and LDLC were measured enzymatically, utilizing assays standardized by our participation in the CDC-NHLBI Reference Lipid and Lipoprotein Program. The animals were then divided into two groups of eight with one group, designated the control group, remaining on the sunflower oil, while the second group of animals were switched to 10% corn fiber oil and 0.4% cholesterol for four more weeks of diet treatment. At this point, animals were rebled and their plasma TC, HDLC and LDLC determined once again. Results are shown in FIG. 1.

The degree of increase of LDLC in animals fed the control diet was 125% greater than the experience of animals switched to the corn fiber oil diet, and this reduction in the rate of rise of LDLC by corn fiber oil was not associated with any adverse effects on HDLC. Since the fatty acid composition of both sunflower oil and corn fiber oil are similar (@60% linoleic acid, 20% oleic acid and 12% total saturates), indicates that the ability of corn fiber oil-fed animals to decrease the rate of rise of LDLC cannot be explained by a more optimum fatty acid profile.

We claim:

1. An oil extracted from corn fiber, wherein said corn fiber is the fiber fraction separated from the corn kernel during a wet-milling, and said corn fiber oil comprises ferulate esters.

2. The oil of claim 1, wherein said ferulate esters comprise sitostanyl ferulate.

3. The oil of claim 1, wherein said corn fiber oil comprises sterol-fatty acid esters, phytosterols and tocopherols in addition to ferulate esters.

4. A composition comprising oil extracted from corn fiber and an ingestible carrier, wherein said corn fiber is the fiber fraction separated from the corn kernel during a wet-milling.

5. The composition of claim 4, wherein said corn fiber oil comprises ferulate esters.

6. The composition of claim 5, wherein said ferulate esters comprise sitostanyl ferulate.

7. The composition of claim 5, wherein said corn fiber oil is present in said composition in an amount up to about 10 wt % of the composition, and where the corn fiber oil contains about 6% ferulate esters.

8. The composition of claim 5, wherein said corn fiber oil comprises sterol-fatty acid esters, phytosterols and tocopherols in addition to ferulate esters.

9. A method of preparing corn fiber oil, said method comprising a) separating corn fiber from corn kernels by a wet milling process, b) drying the corn fiber, c) grinding the corn fiber, d) extracting oil from the ground corn fiber by means selected from the group consisting of an organic solvent and supercritical fluid extraction, and e) separating the extracted corn fiber oil from the organic solvent.

10. The method of claim 9 a), wherein the corn fiber is separated from the corn kernel by steeping corn kernels in aqueous $SO_2$ at a temperature of about 50° C. to about 55° C. for about 24 hours to about 48 hours, gently grinding the steeped corn kernels and separating the outer fiber layers from the remainder of the kernel.

11. The method of claim 9 d), wherein said organic solvent is hexane.

12. The method of claim 11, wherein said corn fiber and said hexane are mixed and shaken for about one hour at a temperature of about 25° C.

13. A method of lowering blood cholesterol, said method comprising administering a composition comprising oil extracted from corn fiber and an ingestible carrier in an amount effective for lowering said cholesterol.

14. The method of claim 13, wherein said corn fiber oil comprises ferulate esters and said corn fiber oil is present in the composition in an amount up to about 10 wt % of the composition, and where the corn fiber oil contains about 6% ferulate esters.

15. The method of claim 14, wherein said corn fiber oil comprises sterol-fatty acid esters, phytosterols and tocopherols in addition to ferulate esters.

16. The method of claim 14, wherein said ferulate esters comprise sitostanyl esters.

* * * * *

UNITED STATES PATENT AND TRADEMARK OFFICE
CERTIFICATE OF CORRECTION

PATENT NO. : 5,843,499

DATED : December 1, 1998

INVENTOR(S) : Robert A. Moreau, Kevin B. Hicks, Robert J. Nicolosi and Robert A. Norton It is certified that error appears in the above-identified patent and that said Letters Patent is hereby corrected as shown below:

On the Title Page, Item [73], insert additonal assignee, ---- University of Masssachusetts Lowell, MA 01854 ----

Signed and Sealed this

Twenty-second Day of May, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO.    : 5,843,499
DATED         : December 1, 1998
INVENTOR(S)   : Robert A. Moreau, Kevin B. Hicks, Robert J. Nicolosi and Robert A. Norton It is certified that error appears in the above-identified patent and that said Letters Patent is hereby corrected as shown below:

Title page,
Item [73], Assignee, -- University of Massachusetts
            Lowell, MA 01854 --

Signed and Sealed this

Fifth Day of March, 2002

Attest:

Attesting Officer

JAMES E. ROGAN
Director of the United States Patent and Trademark Office